United States Patent
Thiele et al.

[11] Patent Number: 6,073,087
[45] Date of Patent: Jun. 6, 2000

[54] DIGITAL TACHOMETER

[75] Inventors: Kevin James Thiele, Milpitas, Calif.; Douglas W. Sweet, Kokomo, Ind.

[73] Assignee: Philips Electronics North America Corporation, New York, N.Y.

[21] Appl. No.: 08/752,887

[22] Filed: Nov. 20, 1996

[51] Int. Cl.[7] ............................... G01P 3/48; G01R 23/02
[52] U.S. Cl. .................. 702/147; 702/141; 702/142; 324/160; 324/164; 324/166; 73/488
[58] Field of Search .......................... 364/565; 324/160, 324/166, 164; 73/1.37, 488, 506, 508, 509; 702/87, 96, 142, 147, 141; 701/93, 110

[56] References Cited

U.S. PATENT DOCUMENTS

| | | | |
|---|---|---|---|
| 3,805,089 | 4/1974 | Rau et al. ................................ | 307/233 |
| 3,891,833 | 6/1975 | Rhoton et al. ......................... | 235/150.2 |
| 3,968,434 | 7/1976 | Dixon et al. ............................ | 324/166 |
| 4,051,434 | 9/1977 | Sweet . | |
| 4,138,723 | 2/1979 | Nehmer et al. ........................ | 364/424 |
| 4,286,685 | 9/1981 | Rudolph et al. ....................... | 180/176 |
| 4,777,435 | 10/1988 | Lepley et al. ........................... | 324/166 |
| 5,803,043 | 9/1998 | Bayron et al. .......................... | 123/335 |

Primary Examiner—Marc S. Hoff
Assistant Examiner—Hien Vo
Attorney, Agent, or Firm—Brian J. Wieghaus

[57] ABSTRACT

A circuit for generating a speed value corresponding to a rotational frequency of a rotating shaft. A digital tachometer circuit has a tachometer circuit and a copy/hold circuit. The tachometer circuit maintains an intermediate speed value which is incremented by a gain constant as the rotational frequency increases and is decremented as the rotational frequency decreases. The copy/hold circuit samples the intermediate speed value at selected intervals, thus generating the speed value. The speed value is displayed to a user and represents the vehicle's speed.

30 Claims, 6 Drawing Sheets

DIGITAL TACHOMETER

BACKGROUND OF THE INVENTION

1. Field of the Invention

The present invention relates generally to apparatus and methods for measuring the frequency of an input signal, and more particularly for measuring the frequency of an input signal for a tachometer.

2. Discussion of Background Art

Automotive tachometers are mass market devices designed for overall functionality and low cost. Since cost is typically the driving factor in tachometer design and only a reasonable degree of accuracy is typically required, many automotive tachometers are comprised of a minimum number of components. An added benefit of having very few components is a tachometer that also requires fewer silicon resources.

Low cost frequency measuring circuits, however, have performance limitations. Many circuits, for instance, non-linearly translate frequency pulses into a frequency value. As a result, a display must be modified to compensate for the non-linearly increasing frequency values. In an analog display, this is often compensated for by adjusting spacing between gauge marks painted on the analog display. The resultant display then has gauge marks whose spacing is non-uniform.

Many low-cost frequency measuring circuits also suffer from a "ratcheting effect" under deceleration conditions. This ratcheting effect is noticeable as a series of needle jumps on an analog display, instead of a smooth continuous movement as would be expected by one viewing the display.

What is needed is a tachometer circuit that overcomes the limitations of the prior art described above.

SUMMARY OF THE INVENTION

The present invention is an apparatus and method for digitally measuring speed. Within the apparatus of the present invention, a tachometer circuit computes a Tachometer Register Value (TRV). The TRV represents a real time approximation of a speed at which a vehicle is traveling as represented by the equation: $TRV_{NEW}=TRV_{CURRENT}+Kg-TRV_{CURRENT}/D$, where "$TRV_{NEW}$" is a new TRV to be calculated, "$TRV_{CURRENT}$" is a current TRV, "Kg" is a gain constant added to increase $TRV_{NEW}$, and "D" is a constant used in subtracting a percentage of $TRV_{CURRENT}$ from $TRV_{NEW}$. An overspeed limiter prevents $TRV_{NEW}$ from rising above a preset maximum value.

When the vehicle is initially turned off, the tachometer circuit continues to be temporarily powered so as to return a display gauge to zero by calculating $TRV_{NEW}$ according to the following equation: $TRV_{NEW}=TRV_{CURRENT}-Krtz$, where Krtz is a constant amount subtracted to decrease the $TRV_{NEW}$.

A copy/hold circuit monitors and copies the ten most significant bits (MSBs) of the TRV at selected intervals. The ten-MSBs of the TRV are defined as a speed value and are sent to the display gauge for viewing by a user. A zero offset constant added to the TRV enables the display gauge to be aligned to a zero pointer position. A serial comparitor and copy control ensures that the speed value equals the ten-MSBs of the TRV as the TRV decreases.

Within the method of the present invention, a current TRV is stored in a first shift register. After an input pulse representing one frequency cycle is received and while the vehicle is running, the tachometer circuit calculates a new TRV according to the equation, $TRV_{NEW}=TRV_{CURRENT}+Kg-TRV_{CURRENT}/D$. When the vehicle is turned off the tachometer circuit calculates a new TRV according to the equation, $TRV_{NEW}=TRV_{CURRENT}-Krtz$ until the $TRV_{NEW}$ has returned to zero. A speed value (SV) to be displayed to a user is calculated according to the equation: SV=10MSBs of ($TRV_{NEW}$)+Kb, where Kb is a zero offset.

The apparatus and method of the present invention are advantageous because dual adders within the tachometer circuit enable the addition and subtraction within the TRV equations to be performed before a final value of $TRV_{NEW}$ is passed on to the copy/hold circuit and thus the digital tachometer's linearity is improved. Also, during deceleration the speed value is continously updated, thus smoothing any racheting effect on the display gauge.

DETAILED DESCRIPTION OF THE PREFERRED EMBODIMENT

While the present invention is describe below with reference to a tachometer, those skilled in the art will recognize that the subject matter taught is wholly applicable to speedometers.

Figure 1:
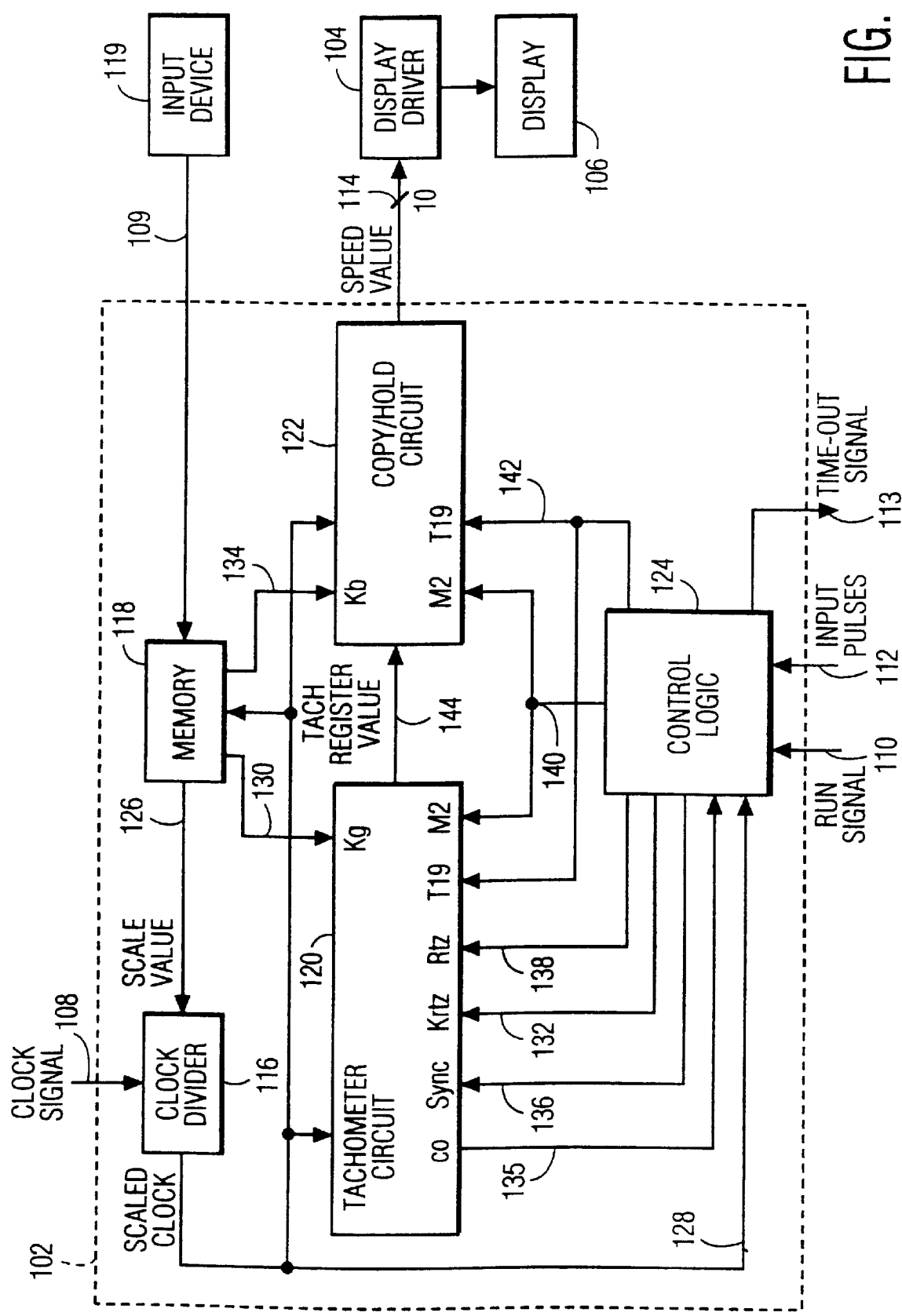
FIG. 1 is a block diagram of a digital tachometer coupled to a display driver and a display.

FIG. 1 is a block diagram of a digital tachometer 102 coupled to an input device 119, a display driver 104 and a display 106. The digital tachometer 102 receives a clock signal on line 108, an input signal on line 109, a run signal on line 110, and input pulses on line 112. The clock signal is a square wave signal with square wave clock pulses, of constant frequency generated by a crystal oscillator (not shown). The input signal is comprised of constants received from a user input to the input device 119, for programming the digital tachometer 102. The run signal is "true" when a vehicle containing the digital tachometer 102 is running and is "false" when the vehicle is turned off. Power continues to be applied to the digital tachometer 102 for a period of time after the vehicle is turned off so that the digital tachometer 102 may execute any necessary functions in response to the run signal being set to "false." The input pulses 112 are received from a transducer (not shown). The digital tachometer 102 processes the clock signal, the run signal, and the input pulses on line 112 to generate a 10 bit speed value on line 114. Line 114 is a 10 bit parallel bus. The display driver 104 is preferably a Philips SA-5775 Trigonometric Digital to Analog Gauge Driver which receives and converts the 10 bit speed value into an analog signal for driving the display 106. The display 106 rotates an analog needle in response to a magnetic force induced by the analog signal so as to display the speed value to a user. The digital tachometer 102 also outputs a time-out signal on line 113. The time-out signal is set to "true" for a selected period of time after the run signal is set to "false." While the time-out signal is set to "true," other circuits (not shown) on the vehicle are provided power even after the run signal is set to "false."

The digital tachometer 102 includes a clock divider 116, a memory 118, a tachometer circuit 120, a copy/hold circuit 122, and control logic 124. The clock divider 116 receives as input the clock signal over line 108 and a scale value over line 126 from the memory 118 and outputs a scaled clock signal over line 128. The scaled clock signal is the clock signal divided down by the scale value. The scale value is entered into the memory 118 by the input device 119, allowing a user to adjust a rate at which the digital tachometer 102 calculates the speed value. While not always shown, the scaled clock on line 128 drives all components within the tachometer circuit 102 that a person of ordinary skill would recognize as requiring clock pulses to function.

The memory 118 functions as a repository for a set of user defined constants, and therefore, may be a set of dedicated registers. These user defined constants are entered into the memory 118 by a user through the input device 119. The memory 118 outputs the scale value on line 126, a gain constant (Kg) on line 130, and a zero offset constant (Kb) on line 134. Kg in conjunction with the scale value allows a user to adjust the rate at which the digital tachometer 102 calculates the speed value. The frequency with which the digital tachometer 102 calculates the speed value may be increased by increasing the frequency of the scaled clock and increasing the gain constant, or decreased by decreasing the frequency of the scaled clock and decreasing the gain constant. Kb allows a user to calibrate the digital tachometer 102 with different zero offsets.

The control logic 124 controls how the tachometer circuit 120 and the copy/hold circuit 122 generate the speed value on line 114. The control logic 124 inputs a carry-out (co) signal on line 135, the scaled clock on line 128, the run signal on line 110, and the input pulses on line 112. The control logic 124 outputs a time-out signal on line 113, a return to zero constant (Krtz) on line 132, a synchronization signal (sync) on line 136, a return to zero control signal (Rtz) on line 138, a mark pulse (M2) signal on line 140, and a latch control (T19) signal on line 142.

The control logic 124 contains a 20-state counter corresponding to a 20-bit Tachometer Register Value (TRV) calculated by the tachometer circuit 120. The 20-state counter enables the control logic 124 to determine at what stage a new TRV calculation is at. During this calculation, the control logic 124 uses the sync signal to mask out the ten Least Significant Bits (LSBs) of the 20-bit TRV in support of serial division functions performed by the tachometer circuit 120. When the control logic 124 determines that a new TRV has been calculated, the control logic 124 issues the T19 signal on line 142. If the run signal on line 110 is set to "false," the control logic 124 uses the Rtz signal on line 138 to command the tachometer circuit 120 into a constant subtraction mode where Krtz on line 132 is a constant subtracted from the TRV until the TRV returns to zero. When the run signal is "true," the control logic 124 uses the Rtz signal to command the tachometer circuit 120 into a percentage subtraction mode. The control logic 124 also generates the M2 signal on line 140 each time an input pulse is received on line 112.

The control logic 124 generates the time out signal on line 113 while the run signal is "true" and for several seconds after the run signal is set to "false." When the run signal is set to "false," the control logic 124 first sets the Krtz constant to its "return to zero value". The tachometer circuit 120 uses this "return to zero value" to reduce the TRV. After the TRV is reduced to zero a first time, the TRV is further reduced below zero by the "return to zero value," resulting in a carry-out being generated on line 135. The control logic 124 detects this carry-out, and in response first, stops sending the T19 signal on line 142 so as to prevent any new speed values from being sent out on line 114 and second, sets the Krtz constant to a "time-out value." The tachometer circuit 120 then subtracts the "time-out value" from the TRV in the same manner as the "return to zero value" was subtracted, until the TRV returns below zero a second time and another carry-out is generated on line 135. After the control logic 124 detects the carry-out, the control logic 124 sets the time-out signal on line 113 to "false." The "return to zero value" is preferably chosen so that the TRV returns to zero the second time in about eight seconds.

The tachometer circuit 120 inputs the scaled clock on line 128, the Kg on line 130, Krtz on line 132, Sync on line 136, Rtz on line 138, T19 on line 142, and M2 on line 140. The tachometer circuit 120 outputs the carry-out on line 135 and the TRV on line 144. The TRV is a constantly changing value which periodically equals the speed value. The TRV is a 20-bit word calculated by the tachometer circuit 120 using one's complement serial arithmetic. Those skilled in the art will recognize that parallel arithmetic can also be used to perform the calculation. Additional operational details are provided below with respect to FIG. 2.

The copy/hold circuit 122 inputs the scaled clock on line 128, the TRV on line 144, Kb on line 134, M2 on line 140, and T19 on line 142 and outputs the speed value on line 114. The copy/hold circuit's 122 primary function is to sample the TRV. The sampled TRV is the speed value. Additional operational details are provided below with respect to FIG. 3.

Figure 2:
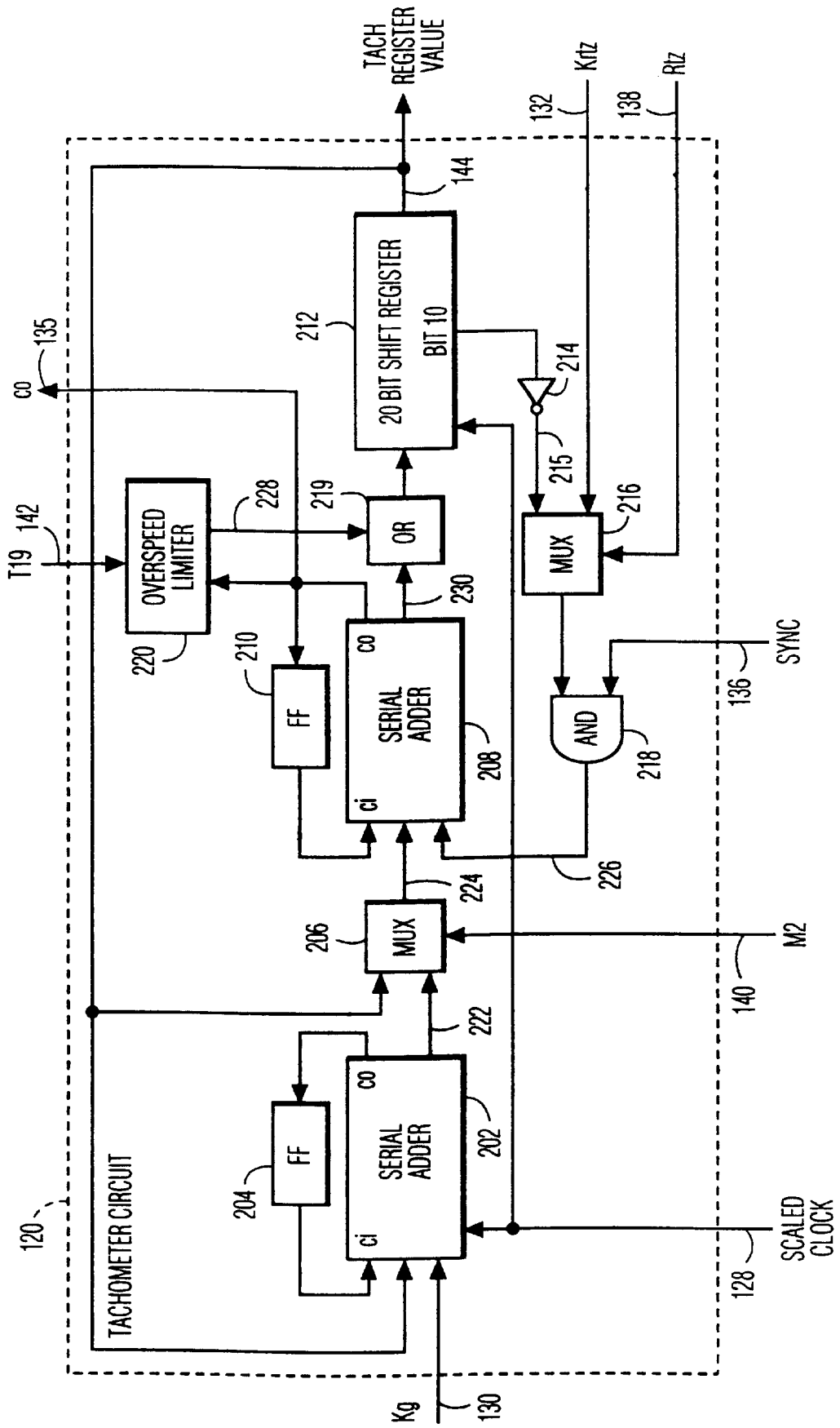
FIG. 2 is a block diagram of a tachometer circuit in the digital tachometer of FIG. 1.

FIG. 2 is a block diagram of the tachometer circuit 120 in the digital tachometer 102 of FIG. 1. The tachometer circuit 120 is comprised of first serial adder 202 having a carry-out (co) and a carry-in (ci) terminals, a first flip-flop 204, a first MUX 206, a second serial adder 208 having carry-out (co) and carry-in (ci) terminals, a second flip-flop 210, a 20-bit shift register 212, an inverter 214, a second MUX 216, an AND gate 218, an OR gate 219, and an overspeed limiter 220. A "MUX" is here defined in a conventional sense as a "multiplexer" and allows one output signal to be selected from multiple input signals. The elements that comprise the tachometer circuit 120 support serial arithmetic as is well known to those skilled in the art. Additionally, common circuit connections known to those skilled in the art, like scaled clock inputs (except as shown for the two serial adders 202, 208) and positive and negative voltage, are not shown.

A current tachometer register value ($TRV_{CURRENT}$) is stored in the 20-bit shift register 212 and is serially output on line 144 to the copy/hold circuit 122, the first MUX 206, and the first serial adder 202. The first serial adder 202 sums the gain constant (Kg) on line 130, $TRV_{CURRENT}$ line 144, and any carry-out stored in the first flip-flop 204 from a prior summation on the first serial adder 202. A first sum is output from the first serial adder 202 on line 222. The first MUX 206 routes the first sum, on line 222, to the second adder over line 224, if M2, on line 140, is set to a "true" state. M2 is set to "true" by the control logic 124 each time the control logic 124 receives an input pulse on line 112. If M2 is set to "false," then the first MUX 206 routes the $TRV_{CURRENT}$, on line 144, to the second adder over line 224.

The second serial adder 208 sums the output from the first MUX 206 on line 224, the AND gate 218 output on line 226, and any carry-out stored in the second flip-flop 210 from a prior summation on the second serial adder 208. A second sum is output from the second serial adder 208 on line 230 to the OR gate 219. Under normal conditions, the OR gate 219 receives a logic level set to "false" on line 228 so the second sum is passed directly onto the 20-bit shift register 212.

The overspeed limiter 220 detects an overflow condition from the second adder's 208 carry-out output. If an overflow is detected after the most significant bit (MSB) of a new TRV ($TRV_{NEW}$) is calculated, then $TRV_{NEW}$ exceeds the maximum possible TRV, which results in an error condition. The overspeed limiter 220 receives the T19 pulse on line 142 every time the MSB has been calculated so as to determine when to monitor the carry-out bit from the second serial adder 208. In response to an error condition, the overspeed limiter 220 sets the logic level on line 228 to "true." As a result each bit in the 20-bit shift register 212 is set to "true," which equals the maximum possible TRV.

The 20-bit shift register 212 is comprised of 10 MSBs and 10 least significant bits (LSBs). While all 20 bits of the $TRV_{CURRENT}$ are serially output on line 144, only the 10 MSBs are output by the copy/hold circuit 122 as the speed value on line 114. Bit 10 of the 20-bit shift register 212 is fed into the inverter 214. The inverter's 214 output is connected to the second MUX 216 by line 215. The second MUX 216 is also connected to Krtz on line 132. The control signal Rtz on line 138 commands the second MUX 216 to route either the signal on line 215 or the signal on line 132 to the AND gate 218. The AND gate 218 also receives the sync signal on line 136. The AND gate 218 then performs a logical "AND" operation on the two inputs and outputs a result on line 226. Since one's complement serial arithmetic is used, if the sync signal on line 136 is ever set to "true," the effect will be to mask the output from the second MUX 216 on line 226. It is via this path that a division is performed using serial addition techniques.

According to the tachometer circuit 120 connections described, when M2 is "true" and Rtz selects the signal on line 215, then the tachometer circuit 120 implements equation (1) using serial arithmetic.

$$TRV_{NEW} = TRV_{CURRENT} + Kg - TRV_{CURRENT}/D \quad (1)$$

where D is preferably 1024 for a 20-bit TRV.

However, when M2 is "false" and Rtz selects the signal on line 215, then the tachometer circuit 120 implements equation (2) using serial arithmetic.

$$TRV_{NEW} = TRV_{CURRENT} - TRV_{CURRENT}/D \quad (2)$$

where D is preferably 1024 for a 20-bit TRV.

Lastly, when M2 is "false" and Rtz selects the signal on line 132, then the tachometer circuit 120 implements equation (3) using serial arithmetic.

$$TRV_{NEW} = TRV_{CURRENT} - Krtz \quad (3)$$

The frequency with which equation (1) is solved is dependent upon the frequency of the input pulses on line 112. However, the frequency with which equations (2) and (3) are solved is constant and dependent upon the frequency of the scaled clock signal on line 128. If the TRV word size is more than 20-bits, then "D" in equations (1) and (2) is, in the preferred embodiment, set equal to $2^{TRVword\text{-}size/2}$. However, those skilled in the art will recognize that "D" can assume many different values.

Figure 3:
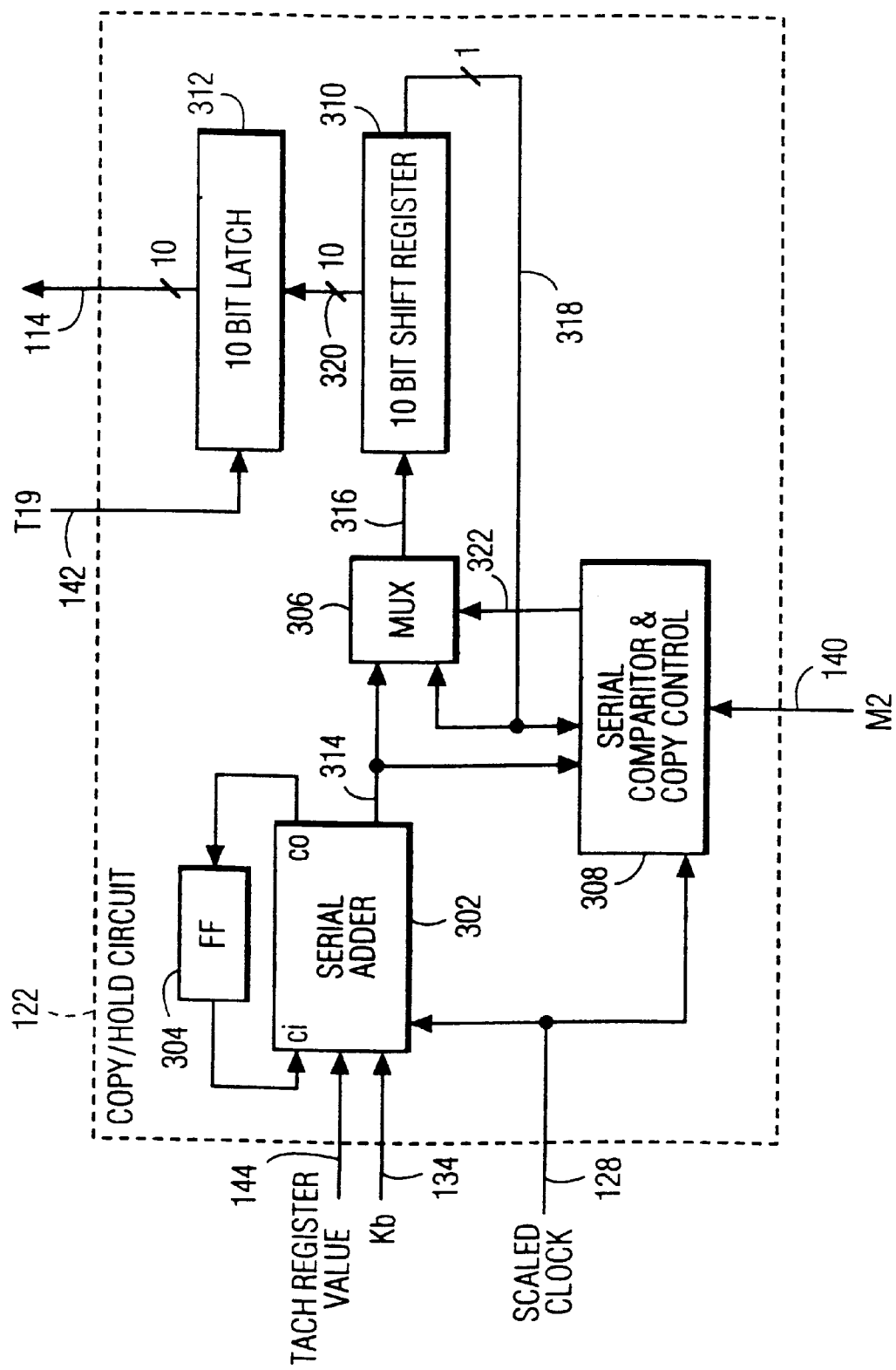
FIG. 3 is a block diagram of a copy/hold circuit in the digital tachometer of FIG. 1.

FIG. 3 is a block diagram of the copy/hold circuit 122 in the digital tachometer 102 of FIG. 1. The copy/hold circuit 122 includes a third serial adder 302, a third flip-flop 304, a third MUX 306, a serial comparitor & copy control (SCCC) 308, a 10-bit shift register 310, and a 10-bit latch 312. Common circuit connections known to those skilled in the art, like scaled clock inputs (except as shown for the serial adders 302) and positive and negative voltage, are not shown. The third serial adder 302 sums the $TRV_{NEW}$ on line 144, the zero offset (Kb) on line 134, and any carry-out bit stored in the third flip-flop 304 from a prior summation on the third serial adder 302. A third sum, equal to $TRV_{NEW}+Kb$, is output from the third serial adder 302 on line 314 to the third MUX 306 and the SCCC 308. The third MUX 306 routes the third sum over line 316 to the 10-bit shift register 310 if a first control signal is present on line 322. Only the 10 MSBs of $TRV_{NEW}+Kb$ are held in the 10-bit shift register 310. The 10 LSBs simply overflow out the opposite end of the 10-bit shift register 310. The 10-bit shift register 310 has both a 1-bit serial output terminal connected to line 318 and 10 parallel output terminals, together depicted as being connected to the 10-bit latch 312 on line 320.

The SCCC 308 serially receives both a next value for the $TRV_{NEW}+Kb$ on line 314 and a prior value for the 10MSBs of $TRV_{NEW}+Kb$ on line 318. Whenever the SCCC 308 receives an M2 pulse on line 140, or if the 10 MSBs of the next value on line 314 are less than the prior value on line 318, the SCCC 308 outputs the first control signal on line 322, and the next value is transmitted by the third MUX 306 into the 10-bit shift register 310. However, if the 10 MSBs of the next value on line 314 are greater than the prior value while there is no M2 pulse on line 140, then the SCCC 308 outputs a second control signal on line 322 so that the prior value on line 318 is recirculated by the third MUX 306 into the 10-bit shift register 310. The 10-bit shift register 310 holds the Speed Value (SV) as defined by equation (4).

$$SV = 10MSBs \text{ of } (TRV_{NEW})+Kb \quad (4)$$

The control logic 124 issues the T19 signal on line 142 enabling the 10-bit latch 312 to store the speed value from the 10-bit shift register 310 every time a new TRV has been loaded into the 10-bit shift register 310. The speed value is then output to the display driver 104 on line 114.

Figure 4:
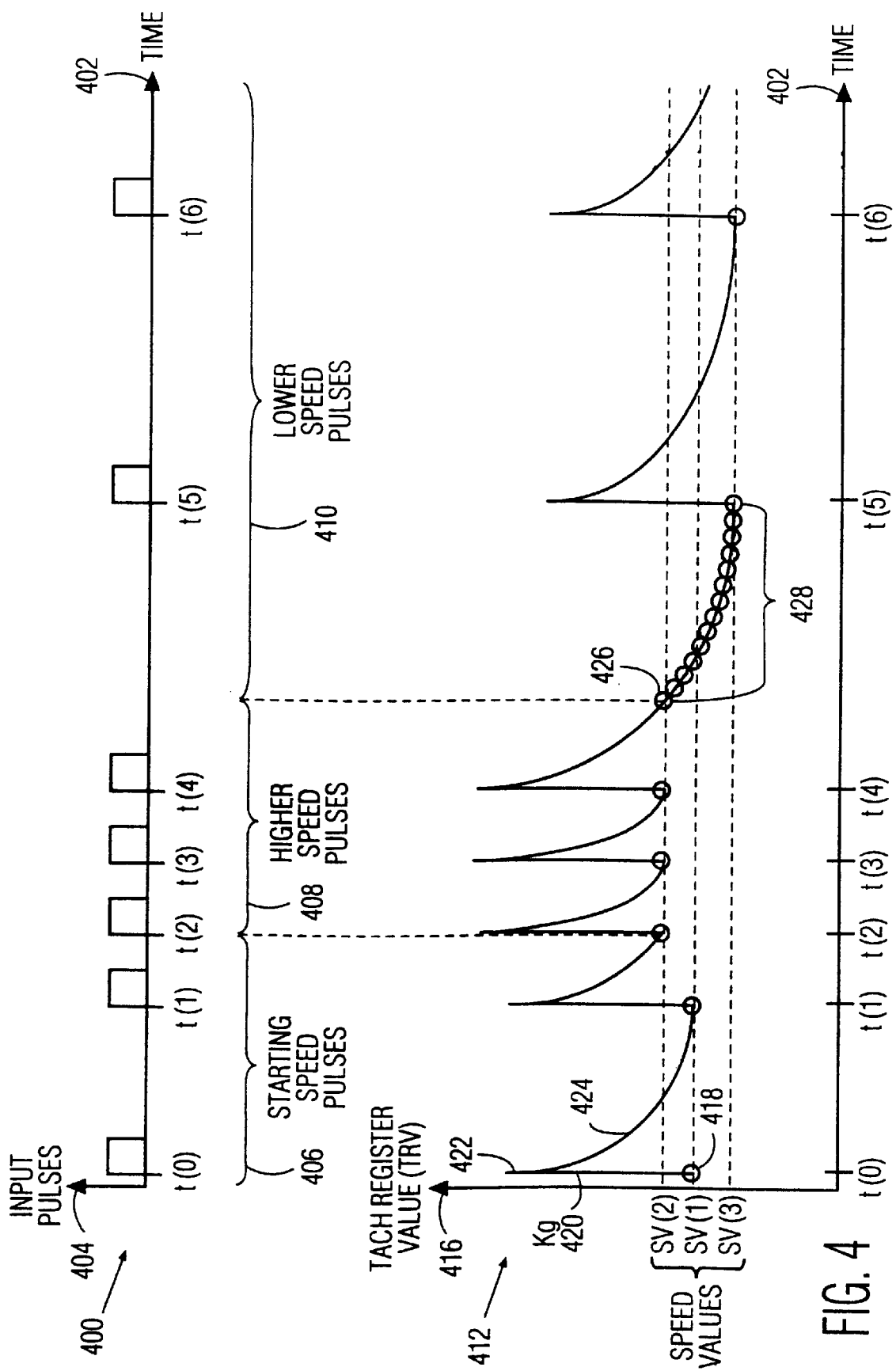
FIG. 4 is an exemplary timing diagram for the digital tachometer.

FIG. 4 is an exemplary timing diagram for the digital tachometer 102. The exemplary timing diagram shows how the digital tachometer 102 reacts while the run signal on line 110 is set to "true."

An exemplary input pulse curve 400 is shown in FIG. 4, where the x-axis indicates increasing time 402 and the y-axis shows an input pulse value 404 present on line 112 in FIG. 1. The input pulse curve 400 includes three input pulse rates labeled as starting speed pulses 406, higher speed pulses 408, and lower speed pulses 410. The closer the input pulses are together in time, the higher the speed value output on line 114 to the display driver 104.

An exemplary TRV curve 412 is also shown in FIG. 4, where the x-axis indicates increasing time 402 and the y-axis shows a TRV 416 present on line 144 in FIG. 1. Each "circle" 418 on the TRV curve 412 represents the speed value output on line 114. The times 402 for both the input pulse value 404 and the TRV 416 correspond one to another.

Before time 402 equals t(0), the Speed Value (SV) is shown as SV(1). The SV(1) value results from the starting speed 406 portion of the input pulse curve 400. At time t(0) an input pulse is received by the digital tachometer 102. In response, the gain constant (Kg) 420 is added to the TRV according to equation (1), raising the TRV 416 to point 422. Between times t(0) and t(1) the TRV 416 is reduced according to equation (2) and shown by portion 424 of the TRV curve 412. At time t(1) when another input pulse is received, first the speed value of SV(1) is output on line 114, then Kg is added to the TRV 416 as before. Between times t(1) and t(2) the TRV 416 is reduced as before; however, before the TRV 416 can reach the SV(1) value a next input pulse is received at t(2). Thus a new speed value of SV(2), which is greater than SV(1) is output on line 114. The SV(2) value results from the higher speed pulses 408 of the input pulse curve 400. This higher speed value is maintained until point 426 of the TRV curve 412 is reached. At point 426 no new input pulse has been received, so the TRV 416 continues to be reduced according to equation (2), as shown by portion 428 of the TRV curve 412. Since each new TRV 416 is less than the prior TRV 416, the copy/hold circuit 122 outputs the steadily falling TRVs for the speed value. At time t(5) a next input pulse is received, but by now the speed value has decreased to SV(3). The SV(3) value results from the lower speed 410 portion of the input pulse curve 400.

Figure 5A:
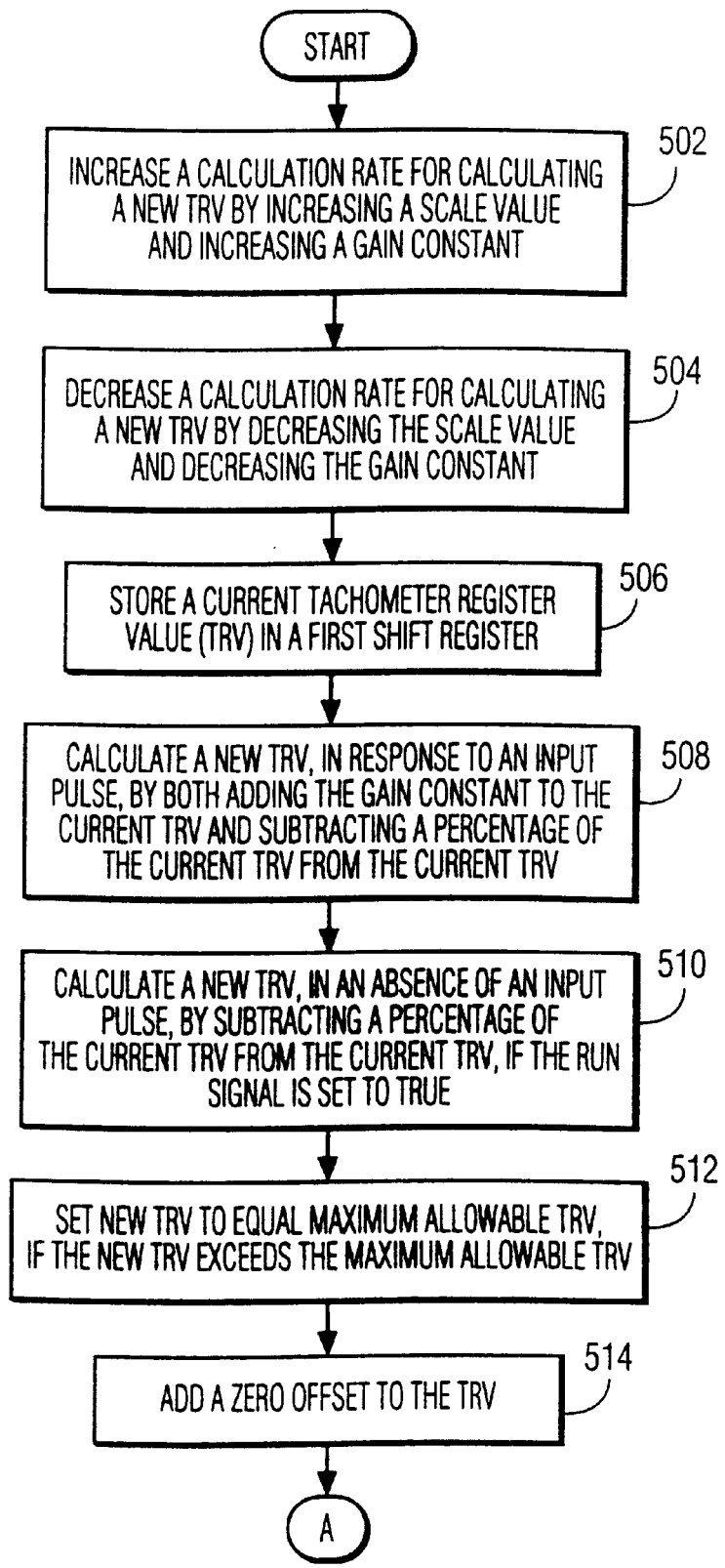
FIGS. 5A and 5B together are a flowchart of a method for operating the digital tachometer.
Figure 5B:
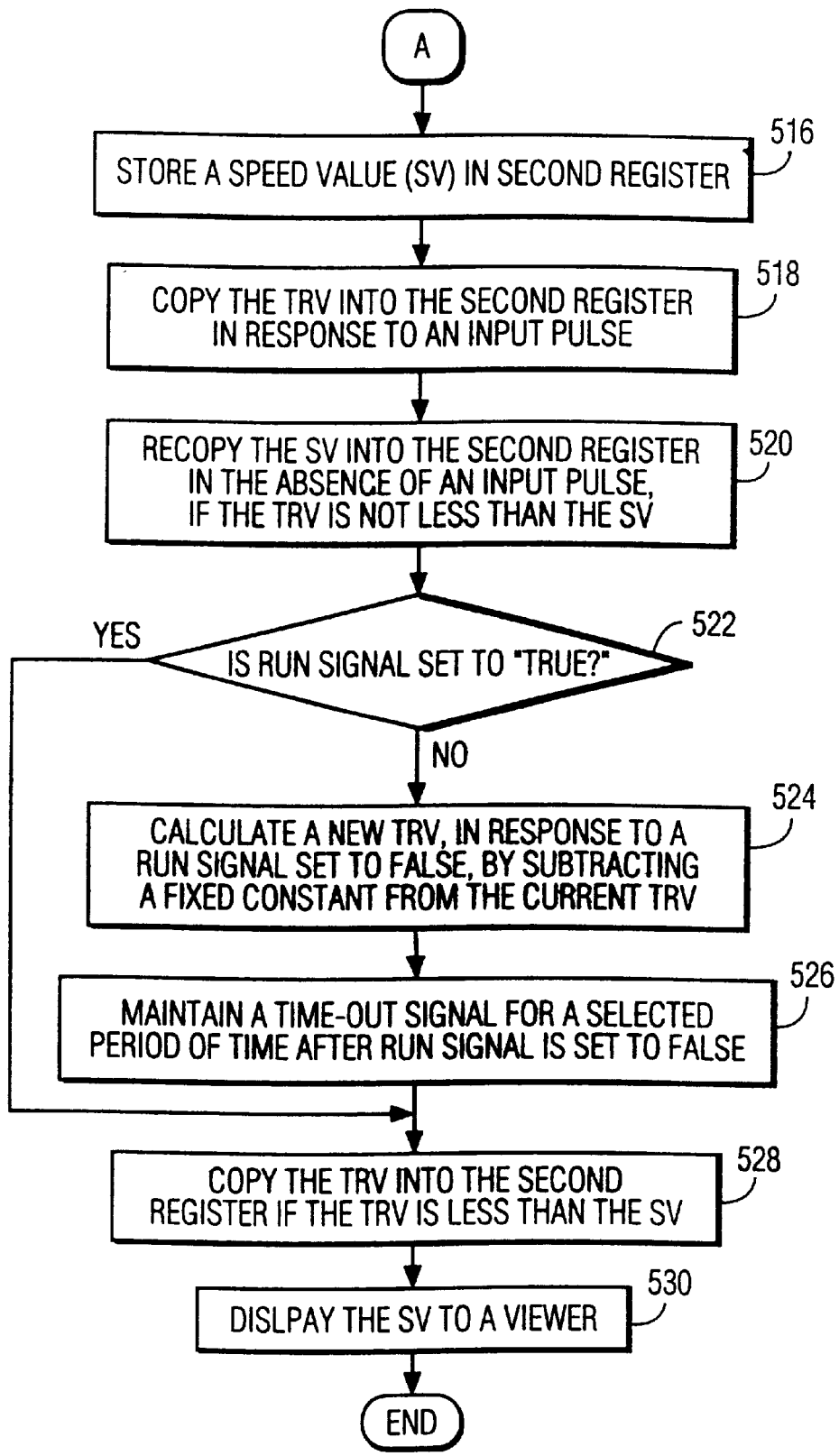

FIGS. 5A and 5B together are a flowchart of a method for operating the digital tachometer 102. The method begins in step 502, where a calculation rate for calculating a new TRV can be increased by increasing a scale value and a gain constant stored in the memory 118. A calculation rate for calculating a new TRV can be decreased by decreasing the scale value and the gain constant stored in the memory 118, in step 504. In step 506 where the current TRV is stored in the 20-bit shift register 212. Next, in step 508 the tachometer circuit 120 calculates the new TRV, in response to an input pulse, by both adding a gain constant to the current TRV and subtracting a percentage of the current TRV from the current TRV according to equation (1). In step 510, the tachometer circuit 120 calculates a new TRV, in an absence of an input pulse, by subtracting a percentage of the current TRV from the current TRV according to equation (2), if the run signal is set to true. In step 512, the overspeed limiter 220 sets a new TRV to equal a maximum allowable TRV, if the new TRV would otherwise exceed the maximum allowable TRV. In step 514, the third serial adder 302 adds a zero offset, stored in the memory 118, to the TRV.

Next in step 516, the 10-bit shift register 310 stores a Speed Value (SV). The SCCC 308 enables the TRV to be copied into the 10-bit shift register 310 in response to an M2 pulse on line 140 which the control logic 124 generates from an input pulse on line 112, in step 518, according to equation (4). In step 520, the SCCC 308 enables the SV to be recopied into the 10-bit shift register 310 in the absence of an M2 pulse on line 140, if the TRV is not less than the SV. In step 522, if the run signal is set to true, the method proceeds to step 528, else the method continues on to step 524. Next in step 524, the tachometer circuit 120 calculates a new TRV, in response to the run signal being set to false, by subtracting a fixed constant (Krtz) from the current TRV according to equation (3). The control logic 124 maintains a time-out signal on line 113 for a period of time after the run signal is set to false, in step 526. In step 528, the SCCC 308 enables the TRV to be copied into the 10-bit shift register 310 if the TRV is less than the SV. Next in step 530 the display driver 104 receives the SV on line 114 and sends the SV to the display 106 for display to a viewer. After step 530, the digital tachometer's operational description is complete.

While the present invention has been described with reference to a preferred embodiment, those skilled in the art will recognize that various modifications may be made. Variations upon and modifications to the preferred embodiment are provided by the present invention, which is limited only by the following claims.

What is claimed is:

1. A digital tachometer for a vehicle, comprising:
    a clock for generating clock pulses;
    a tachometer pulse input for receiving a tachometer input pulse;
    a first register for storing a current tachometer register value;
    a first adder coupled to the first register for receiving the current tachometer register value and a predetermined gain constant, and for generating an intermediate tachometer register value by adding a predetermined gain constant to the current tachometer register value in response to every clock pulse; and
    a second adder, coupled to the first adder, for receiving the intermediate tachometer register value, to the clock for receiving the clock pulses, and to the first register for receiving the current tachometer register value, and for updating the current tachometer register value in the first register, the second adder adding a subtraction value (i) to the intermediate tachometer register value or (ii) to the current tachometer register value in response to (a) every clock pulse and (b) the presence or absence of a tachometer input pulse at the tachometer pulse input;
    wherein the first and second adders are responsive to every clock pulse at all times that the vehicle receives power, so that the current tachometer register value is updated in response to each clock pulse at all times that the vehicle is turned on.

2. The tachometer of claim 1, further comprising:
    a second register for storing a scale value; and
    a clock divider coupled to receive the clock pulses from the clock and the scale value from the second register for altering a frequency of the clock pulses in response to the scale value.

3. The tachometer of claim 1, further comprising a third adder coupled to the first register, for adding a zero offset to the current tachometer register in response to the clock pulses.

4. The tachometer of claim 1, further comprising:
    a speed value register for storing a speed value, and
    a copy control, coupled to the tachometer pulse input and the speed value register, for writing the current tachometer register value into the speed value register to become the speed value in response to a tachometer input pulse.

5. The tachometer of claim 1, further comprising:
    a speed value register having an input terminal and for storing a speed value;
    a selector circuit coupled to the speed value register and having an output terminal coupled to the input terminal of the speed value register, for selecting the current tachometer register value as input to the speed value register if the current tachometer register value is less than the speed value.

6. The tachometer of claim 1, further comprising:
    a speed value register having an input terminal and for storing a speed value;
    a selector circuit coupled to the speed value register and having an output terminal coupled to the input terminal of the speed value register, for selecting the speed value as input to the speed value register in the absence of an input pulse, if the current tachometer register value is greater than the speed value.

7. A digital tachometer for generating a speed value in response to input pulses of varying frequencies and a run signal having a normal state and a return to zero state, comprising:

a clock for generating clock pulses;

a register for storing a current tachometer register value;

an adder, coupled to the register and the clock, for adding a subtraction value to the current tachometer register value in response to each clock pulse, to thereby update the current tachometer register value;

a control circuit, coupled to the adder and to receive the run signal, for setting the subtraction value to a percentage of the current tachometer register value when the run signal is in the normal state; and a copy/hold circuit that generates the speed value for application to a display driver coupled to a display of a vehicle based upon the current tachometer register value stored in the register, whereby the display produces a visual indication of vehicle speed in response to the receipt of the speed value by the display driver;

wherein the adder is responsive to each clock pulse at all times that the vehicle receives power, so that the current tachometer register value is updated in response to each clock pulse at all times that the vehicle is turned on.

8. The tachometer of claim 7, wherein:

the control circuit sets the subtraction value to a constant when the run signal is in the return to zero state; and the run signal is in the return to zero state when the vehicle is turned off.

9. The tachometer of claim 7, wherein;

the control circuit, when the run signal is in the return to zero state sets the subtraction value to a first constant, sets a time-out signal to true, waits until the tachometer register value reaches zero, sets the subtraction value to a second constant, waits until the tachometer register value reaches zero a second time, and sets the time-out signal to false.

10. A visual speed indication system for a vehicle, comprising:

a clock for generating clock pulses;

a tachometer pulse input for receiving a tachometer input pulse;

a first register for storing a current tachometer register value;

a first adder coupled to the first register for receiving the current tachometer register value and a predetermined gain constant, and for generating an intermediate tachometer register value by adding a predetermined gain constant to the current tachometer register value in response to every clock pulse; and a second adder, coupled to the first adder, for receiving the intermediate tachometer register value, to the clock for receiving the clock pulses, and to the first register for receiving the current tachometer register value, and for updating the current tachometer register value in the first register, the second adder adding a subtraction value (i) to the intermediate tachometer register value or (ii) to the current tachometer register value in response to (a) every clock pulse and (b) the presence or absence of a tachometer input pulse at the tachometer pulse input;

a copy/hold circuit that generates a speed value based upon the current tachometer register value; and a display device responsive to the speed value for producing a visual indication of vehicle speed;

wherein the first and second adders are responsive to every clock pulse at all times that the vehicle receives power, so that the current tachometer register value is updated in response to each clock pulse at all times that the vehicle is turned on.

11. A method for calculating a speed value and producing a visual indication of a speed of a vehicle, the method comprising the steps of:

receiving tachometer input pulses at an input;

storing a current tachometer register value;

generating clock pulses;

adding a gain constant to the current tachometer register value to generate an intermediate tachometer register value;

adding in response to each clock pulse a subtraction value (i) to the intermediate tachometer register value or (ii) to the current tachometer register value in response to the presence or absence of a tachometer input pulse at the input to generate a new tachometer register value;

using the new tachometer register value to generate the speed value; and using the speed value to produce the visual indication of the speed of the vehicle;

wherein both adding steps are performed in response to each clock pulse whenever the vehicle receives power, so that the new tachometer register value is generated in response to each clock pulse at all times that the vehicle is turned on.

12. A method of claim 11, further comprising the step of altering a frequency of the clock pulses received by the second adder in response to a scale value received from a user.

13. A method of claim 11, further comprising the step of adding a zero offset to the current tachometer register value in response to the clock pulses.

14. A method of claim 11, further comprising the step of setting the speed value equal to the new tachometer register value in response to an input pulse.

15. A method of claim 11, further comprising the step of setting an updated speed value equal to the new tachometer register value, if the new tachometer register value is less than the current speed value.

16. A method of claim 11, further comprising the step of setting an updated speed value equal to itself in the absence of an input pulse, if the new tachometer register value, if the new tachometer register value is greater than the current speed value.

17. A method of claim 11, further comprising the steps of:

setting the subtraction value to a percentage of the current tachometer register value, in response to a run signal received from a user and set to true; and adding the subtraction value to the current tachometer register value in response to the clock pulses.

18. A method of claim 11, further comprising the steps of:

setting the subtraction value to a fixed constant, in response to a run signal received from a user and set to false; and adding the subtraction value to the current tachometer register value in response to the clock pulses.

19. A method of claim 11, further comprising the steps of:

setting the subtraction value to a first constant, in response to a run signal received from a user and set to false;

setting a time-out signal to true;

adding the subtraction value to the current tachometer register value in response to the clock pulses;

waiting until the tachometer register value reaches zero;

setting the subtraction value to a second constant;

adding the subtraction value to the current tachometer register value in response to the clock pulses;

waiting until the tachometer register value reaches zero a second time; and setting the time-out signal to false.

20. A system for calculating a speed value and producing a visual indication of a speed of a vehicle, the system comprising:

a digital tachometer that generates the speed value in response to input pulses of varying frequencies and a run signal having a normal state and a return to zero state, the digital tachometer including:
   a) a clock for generating clock pulses;
   b) a register for storing a current tachometer value;
   c) an adder, coupled to the register and the clock, for adding a subtraction value to the current tachometer register value in response to each clock pulse, to thereby update the current tachometer register value, wherein the adder is responsive to each clock pulse at all times that the vehicle recieves power, so that current tachometer register value is updated in response to each clock pulse at all times that the vehicle is turned on;
   d) a control circuit, coupled to the adder and to receive the run signal, for setting the subtraction value to a percentage of the current tachometer register value when the run signal is in the normal state; and
   e) a copy/hold circuit that generates the speed value based upon the current tachometer register value stored in the register; and a display device that produces a visual indication of vehicle speed in response to the speed value.

21. A tachometer for generating a speed value in response to tachometer input pulses of varying frequency, comprising:

means for generating clock pulses;

means for storing a current tachometer register value;

means for adding a gain constant to the current tachometer register value to generate an intermediate tachometer register value in response to each clock pulse;

means for adding in response to each clock pulse a subtraction value to the intermediate tachometer register value in response to receipt of a tachometer input pulse to generate a new tachometer register value;

means for using the new tachometer register value to generate the speed value; and means for using the speed value to produce a visual indication of the speed of a vehicle;

wherein both means for adding are responsive to each clock pulse whenever the vehicle receives power, so that the new tachometer register value is generated in response to each clock pulse at all times that the vehicle is turned on.

22. The tachometer of claim 21, further comprising means for altering a frequency of the clock pulses in response to a scale value received from a user to generate scaled clock pulses, the scaled clock pulses driving the means for adding a gain constant and the means for adding a subtraction value.

23. The tachometer of claim 21, further comprising means for adding a zero offset to the current tachometer register value in response to the clock pulses.

24. The tachometer of claim 21, further comprising means for setting the speed value equal to the new tachometer register value in response to an input pulse.

25. The tachometer of claim 21, further comprising means for setting an updated speed value equal to the new tachometer register value, if the new tachometer register value is less than the current speed value.

26. The tachometer of claim 21, further comprising means for setting an updated speed value equal to itself in the absence of an input pulse, if the new tachometer register value, if the new tachometer register value is greater than the current speed value.

27. The tachometer of claim 21, receiving a run signal from a user, further comprising:

means for setting the subtraction value to a percentage of the current tachometer register value, in response to the run signal set to true; and means for adding the subtraction value to the current tachometer register value in response to the clock pulses.

28. The tachometer of claim 21, receiving a run signal from a user, further comprising:

means for setting the subtraction value to a fixed constant, in response to the run signal set to false; and means for adding the subtraction value to the current tachometer register value in response to the clock pulses.

29. The tachometer of claim 21, receiving a run signal from a user and generating a time-out signal, further comprising:

means for setting the subtraction value to a first constant, in response to the run signal set to false;

means for setting the time-out signal to true;

means for adding the subtraction value to the current tachometer register value in response to the clock pulses;

means for waiting until the tachometer register value reaches zero;

means for setting the subtraction value to a second constant;

means for adding the subtraction value to the current tachometer register value in response to the clock pulses;

means for waiting until the tachometer register value reaches zero a second time; and means for setting the time-out signal to false.

30. A system for calculating a speed value and producing a visual indication of a speed of a vehicle, the system comprising:

a digital tachometer that generates the speed value in response to input pulses of varying frequencies and a run signal having a normal state and a return to zero state, the digital tachometer including:
   a) means for generating clock pulses;
   b) means for storing a current tachometer register value;
   c) means for adding a subtraction value to the current tachometer register value in response to each clock pulse, to thereby update the current tachometer register value, wherein the means for adding is responsive to each clock pulse at all times that the vehicle receives power, so that the current tachometer register value is updated in response to each clock pulse at all times that the vehicle is turned on;
   d) means for setting the subtraction value to a percentage of the current tachometer register value when the run signal is in the normal state; and
   e) means for generating the speed value based upon the current tachometer register value; and means for producing a visual indication of vehicle speed in response to the speed value.

* * * * *